United States Patent
Puckett

[11] 3,854,450
[45] Dec. 17, 1974

[54] AQUARIUM ASSEMBLY
[75] Inventor: Sam S. Puckett, Portland, Tex.
[73] Assignee: Atlas Aquariums, Inc., Corpus Christi, Tex.
[22] Filed: June 8, 1972
[21] Appl. No.: 261,070

[52] U.S. Cl. ................................................. 119/5
[51] Int. Cl. ............................................ A01k 64/00
[58] Field of Search .................................. 119/5, 3

[56] References Cited
UNITED STATES PATENTS

| | | | |
|---|---|---|---|
| 2,871,820 | 2/1959 | Hayden | 119/5 |
| 3,091,220 | 5/1963 | Willinger | 119/5 |
| 3,288,110 | 11/1966 | Goldman et al. | 119/5 |
| 3,515,097 | 6/1970 | Sherman | 119/5 |
| 3,516,544 | 6/1970 | Sesholtz | 119/5 X |
| 3,529,574 | 9/1970 | Kelley | 119/5 |

FOREIGN PATENTS OR APPLICATIONS

| | | | |
|---|---|---|---|
| 1,185,420 | 3/1970 | Great Britain | 119/5 |

Primary Examiner—Louis G. Mancene
Assistant Examiner—J. N. Eskovitz
Attorney, Agent, or Firm—Watson, Cole, Grindle & Watson

[57] ABSTRACT

An aquarium assembly comprising a transparent tank body wherein its base, side trim, and lamp hood are each of a synthetic resin material in order to increase the life of the aquarium and to prevent any contamination of the water from metallic rusting. A perforated filter plate spaced from the base, or a plurality of interconnected perforated filter tubes are disposed within the tank, and a biological filter for controlling the waste buildup in the tank is supported on the filter plate or tubes. The tank may be multi-compartmented defined by means of divider walls and a central upright tube through which the air tubes extend for each compartment, and through which the electrical wiring for the lamp may also extend.

8 Claims, 7 Drawing Figures

PATENTED DEC 17 1974

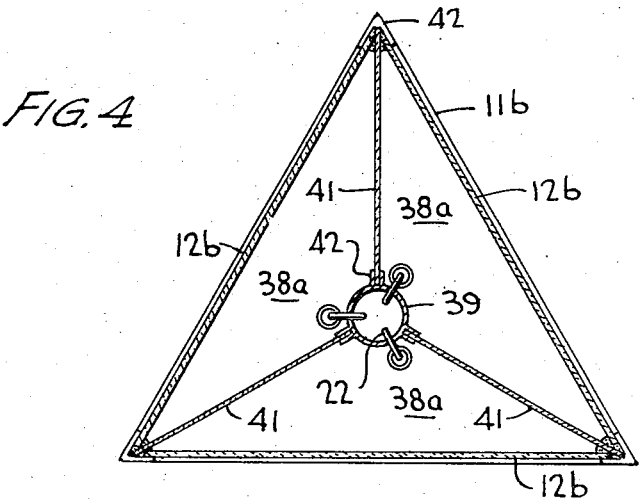
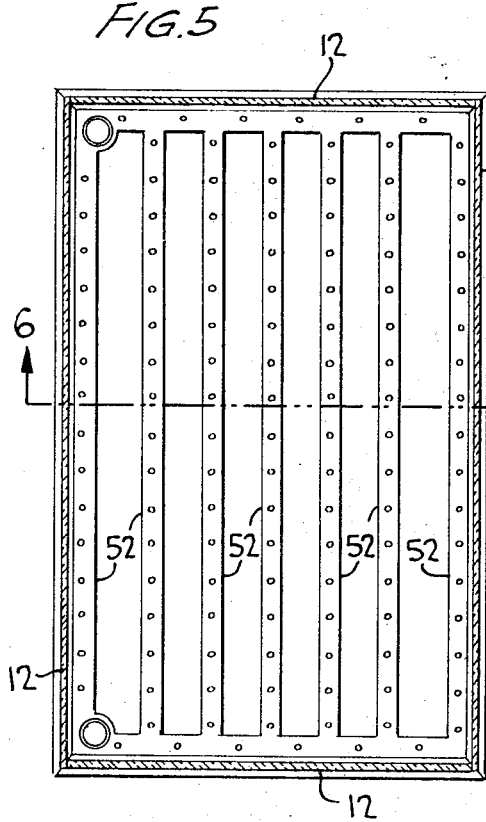
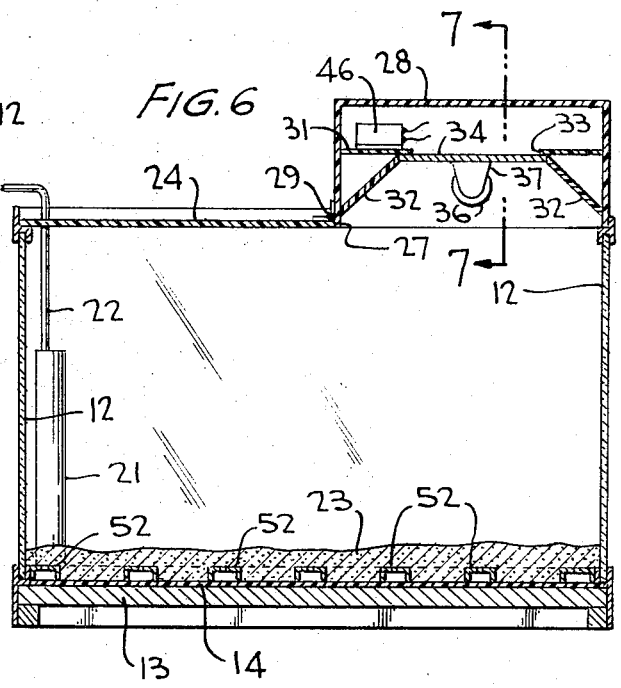
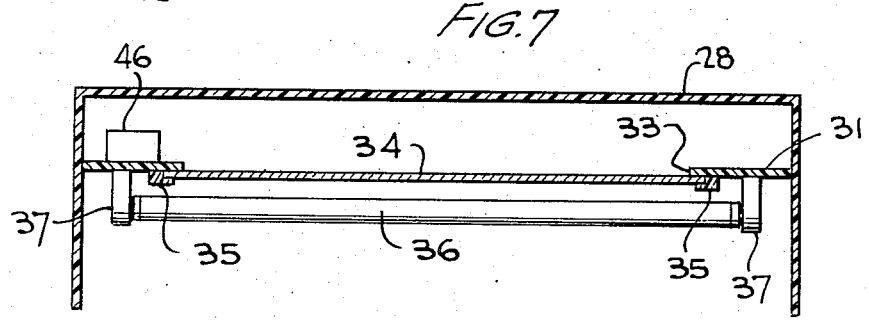

AQUARIUM ASSEMBLY

This invention relates generally to an aquarium assembly and more particularly to such an assembly as having a biological filter for controlling the waste buildup in the tank and being designed for the purpose of avoiding any contamination by metallic rusting of any of the parts, thereby significantly extending the useful life of the assembly. Also, the aquarium may be multi-compartmented.

Many of the presently available aquarium assemblies, which are somewhat complex in their construction and design, must be shipped over possibly long distances as a unit, so that they are not always readily available to the customer, and the high cost of shipping and handling is reflected in their ultimate cost. It therefore becomes desirable to provide a knockdown-type assembly which may be not only easily assembled but makes use of readily available materials locally so that the dealer need not rely on shipped materials. Also, those aquarium assemblies making use of a lamp hood or cover are known to collect condensation along their inner surface so that with the use of any metallic elements in the hood, the condensation would become contaminated with corrosion and drip back into the aquarium. Furthermore, most aquariums are not effectively designed for multi-compartment use without involving an added expense in both construction and design.

It is, accordingly, an object of the present invention to provide an aquarium assembly, constructed of readily available components, which may be easily assembly, yet is completely waterproof and non-corrosive.

Another object of the invention is to provide such an aquarium assembly including a transparent tank body closed at one end by means of a base plate having a layer of synthetic resin thereon, channel side plates for the tank body, a perforated filter plate of synthetic resin spaced from the base plate, a synthetic resin cover plate for the top of the tank body, and a hinged lamp hood also of synthetic plastic material which covers an opening in the cover plate.

A further object of this invention is to provide such an assembly wherein two or more compartments are made possible for the tank body by means of a central upright tube and divider walls extending between the tube and the container body walls. The air tubes for the biological filter in each compartment extend through the upright tube, as does the electric wiring for the lamp, should it be desired to store the various lamp fixture accessories in a shelf below the base plate of the aquarium.

A still further object of this invention is to provide such an aquarium assembly wherein a plurality of perforated and interconnected tubes disposed on the base plate are used in lieu of the spaced, perforated filter plate.

Other objects, advantages and novel features of the invention will become apparent from the following detailed description of the invention when considered in conjunction with the accompanying drawings wherein:

FIG. 4 is a horizontal sectional view through a triangular aquarium assembly in accordance with still another embodiment of the present invention;

FIG. 5 is a horizontal sectional view through yet another embodiment of an aquarium assembly in accordance with the invention;

FIG. 6 is an upright sectional view taken along the line 6—6 of FIG. 5; and

FIG. 7 is a sectional view of the hood taken along the line 7—7 of FIG. 6.

Figure 1:
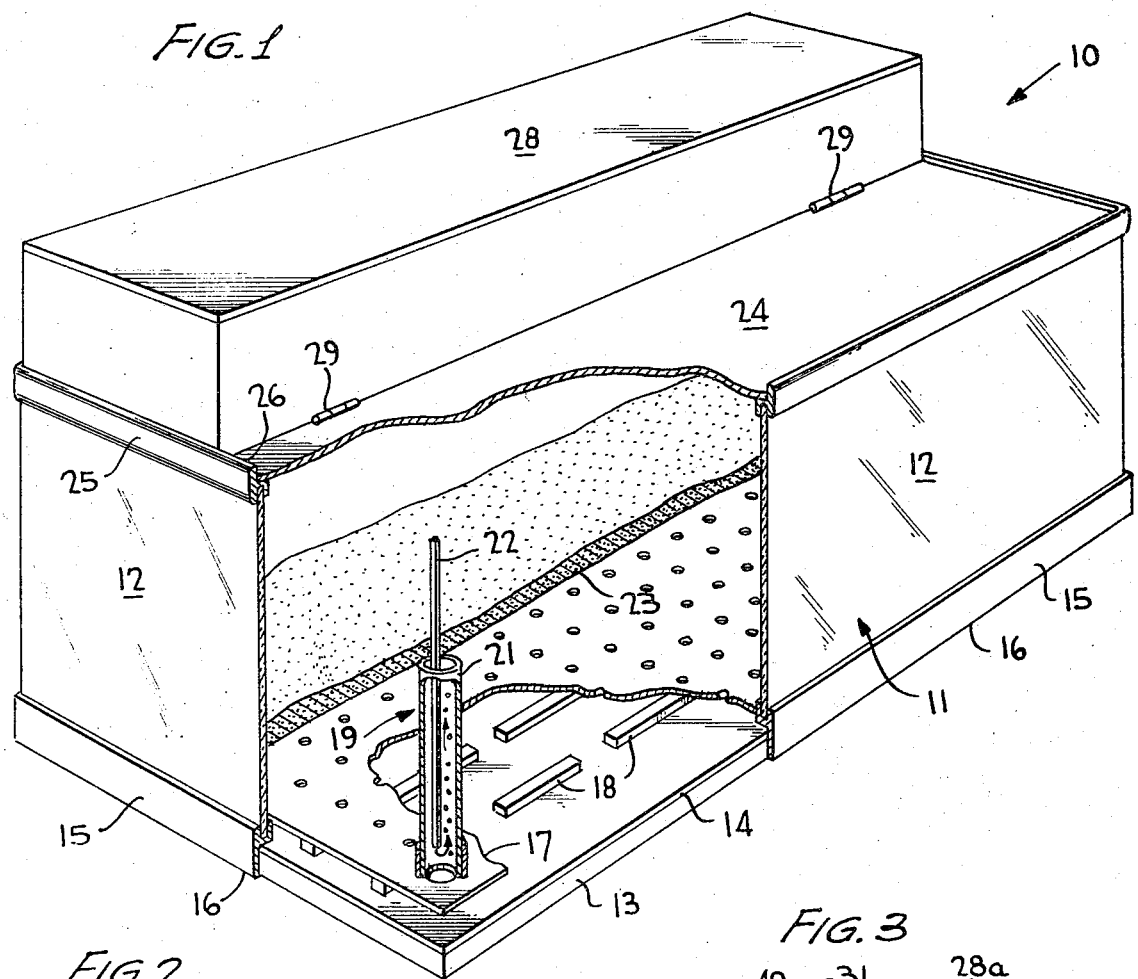
FIG. 1 is a perspective view, partly broken away, showing one embodiment of the aquarium assembly in accordance with the present invention.

Turning now to the drawings wherein like reference characters refer to like and corresponding parts throughout the several views, there is shown in FIG. 1 a rectangular aquarium assembly generally designated 10 and comprising a transparent tank body 11 of side walls 12, which may be of glass and/or any of the high-impact transparent plastics, joined and sealed together along their edges by means of a suitable waterproof adhesive, thereby avoiding any contamination within the tank as with the use of the standard metallic corner joints. The base plate for the tank comprises a plywood sheet 13 surfaced with a sheet 14 of formica or a sheet of synthetic resin of some type which may be thermo-setting or thermo-plastic. Side channel strips 15 are provided for the reception of the lower edge of the side walls which are sealed together and to the sheet 14 by means of any commonly available waterproof adhesive. Strips 15 are each provided with a leg 16 which, as can be seen in FIG. 1, depends from its channel section and neatly covers the base plates 13 and 14. The outer portion of the strips may be provided with an imitation woodgrain finish for enhancing the attractiveness of the assembly.

A perforated filter plate, also of a synthetic resin material, is spaced from the sheet 14 within the tank by means of a plurality of spacers 18 of a of a plastic material cemented by means of a waterproof adhesive to both plate 17 and sheet 14.

A conventional stack 19 for the biological filter comprises a tube 21 mounted at one end over an opening in the perforated filter plate 17, the other end of the tube opening below the level of water in the tank. An air tube 22 is mounted along the interior wall of the tube 21 and is connected through the tank cover with an air source (not shown) so that air pumped therethrough will create a steady stream of air bubbles within the tube 21, thereby lifting the water therein. As the water contained within tube 21 is lifted with the air bubbles, it is replaced by water from beneath the filter plate 17 to provide a continuous circulation of water within the tank flowing from the tube 21 down through the gravel filtrant 23 and openings in the perforated filter plate 17, back into the space lying below the filter plate, and so on.

A cover plate 24 of synthetic resin is provided for the top of the tank body and is sealed along its edges to top channel strips 25 having an outer leg 26 thereof extending upwardly and also coated with a synthetic woodgrain finish. The strips 25 are each of a synthetic resin material and are each sealed by means of waterproof adhesive to both the top edges of the side walls and the peripheral edges of the cover plate. The cover plate 24 is provided with an elongated opening 27 therein (see FIG. 6) which opening is covered by means of a lamp hood or housing 28 made of a synthetic plastic material and hinged by means of hinges 29 along one edge of the opening. A support plate 31, also of a synthetic plastic material, is spaced slightly below the top of hood 28 and is braced by means of plates 32 also of a synthetic resin material. An opening 33 is provided along the length of support plate 31 (see FIGS. 6 and 7) which opening is closed by means of a glass mirror plate 34. Plastic clips 35 are used to conveniently clip the mirror 34 in place.

A fluorescent or similar type lamp 36 is suspended from support plate 31 by means of bracket plates 37 of a synthetic resin material, as seen most clearly in FIG. 7 of the drawings. With such an arrangement, the concealed wiring, ballasts, starters, etc., supported on the plate 31, and shown generally at 46, are exposed to the operator for the purpose of replacement or repair through opening 33 in plate 31 upon removal of mirror 34. It can be therefore seen that the hood construction is entirely of a non-corrosive material with all of the lamp fixture accessories being concealed behind plate 31 and mirror 34 whereby any condensation within the hood will not become contaminated and drip back into the tank as in the case of many prior art designs.

Figure 2:
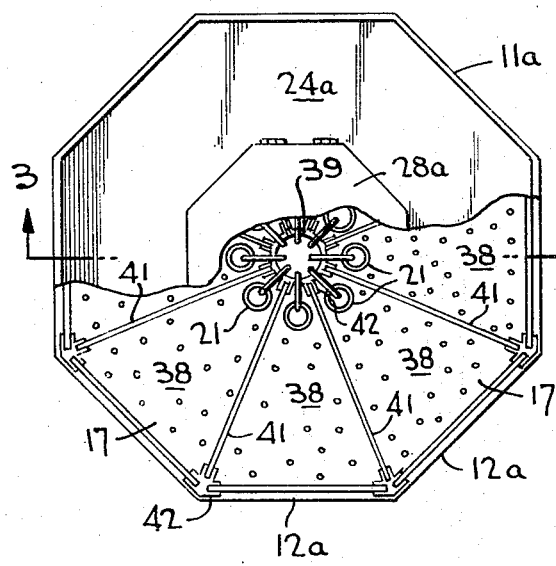
FIG. 2 is a top view of a multi-compartmented octagonal aquarium assembly, partly broken away, in accordance with another embodiment of the invention.
Figure 3:
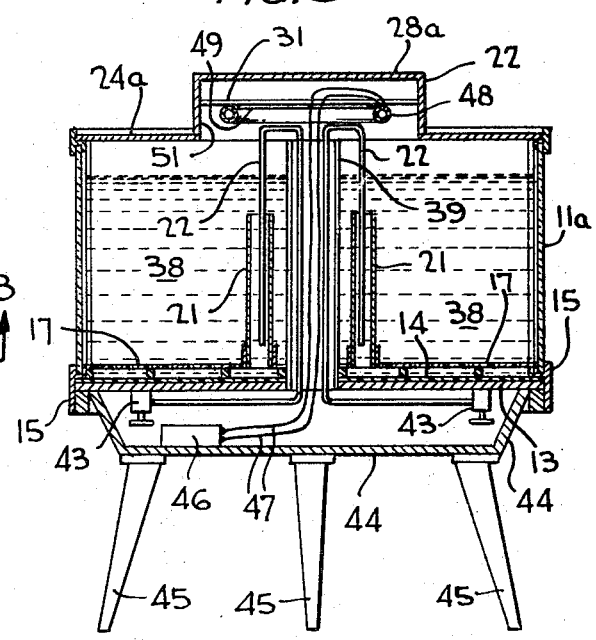
FIG. 3 is a sectional view of the FIG. 2 embodiment taken along the line 3—3 thereof.

It should be understood that the tank body can be of rectangular cross-section, as shown in FIG. 1, or square, hexagonal, octagonal, triangular, or any other cross-section as desired. For example, an eight-sided tank body 11a is shown in FIG. 2 and is constructed similarly in all respects in accordance with the description of the FIG. 1 embodiment except that it is multi-compartmented. Each of the compartments 38 is defined by an upright tube 39 disposed centrally of the tank body and extending through the sheet 13 and plate 14, as clearly seen in FIG. 3. Divider walls 41, of a synthetic resin material, define each compartment 38 and extend between the central tube 39 and the intersection of side walls 12a of the tank body. The divider walls may be each securely held in place by means of a waterproof cement, with or without the aid of plastic brackets 42.

A stack 19 for the biological filter is provided in each compartment and each stack comprises, as before, a water tube 21 mounted at one end over an opening on the triangular-shaped filter plate 17 in each compartment. The air tube 22 for each tube 21 extends through the central tube 39 and outwardly below base plates 13,14 to an air source (not shown) through a valve 43 provided for each air tube to regulate the airflow therethrough.

Also in this embodiment a shelf is provided below sheet 13 by means of plates 44, legs 45 being secured thereto in some conventional manner. The lamp accessories 46, i.e., switch, ballast, starter, etc., rest upon the bottom plate 44 of the shelf, and the electrical wiring 47 therefrom extends upwardly through the central tube 39 and interconnects with a halo-like lamp 48. This lamp is mounted on a support plate 31 within the hood 28a, and a glass mirror 49 is provided below plate 31 for maximum reflection of the light rays into the aquarium tank body. By reason of the shelf below the tank body, it can be seen that the hood 28 is used exclusively for housing the lamp so that access to the lamp accessories may be made through some suitable opening in one of the side plates 44.

Cover 24a in this embodiment is, of course, octagonal, but is secured in place similarly to that of the cover 24 in the FIG. 1 embodiment. The hood 28a is also octagonal in the FIG. 3 embodiment for the purpose of covering a similarly shaped opening 51 in the cover 24a.

With such a multi-compartmented aquarium tank body, it can be seen that various species of aquatic life may be housed in the compartments 38, if desired, or one of the compartments may be drained for cleaning while the remaining compartments are filled. The source of air through each air tube 22 may be simply shut off during the cleaning of a specific compartment by means of its associated valve 43.

In FIG. 4 a triangular-shaped tank body is shown wherein its three sides 12b are sealed together by means of a suitable waterproof cement, with or without the use of brackets 42. Also, a central upright tube 39 is provided through which an air tube 22 extends, in a manner similar to that described for the FIG. 3 embodiment, into each of the triangular compartments 38a and secured along the inner wall of their respective tubes 22 mounted in each compartment in a manner similar to that described for FIG. 2. These compartments are, of course, defined by divider walls 41 extending between the central tube 39 and the intersection of the side plates 12, and secured along opposite edges thereof in a manner similar to that described for the FIG. 2 embodiment.

In the embodiment shown in FIG. 5, an oblong tank is shown similarly constructed in all respects to that of FIG. 1 except that a plurality of perforated and interconnected filter tubes 52 are used in lieu of the filter plate 17 and spacers 18. Each of these tubes is cemented to the top surface of the synthetic resin sheet 14, as shown in FIG. 6, and the tube 21 is mounted over one of the tubes 52, with an air tube 22 secured along the inner surface thereof in a manner and for the same purpose described with reference to the FIG. 1 embodiment.

From the foregoing, it can be seen that an aquarium assembly has been devised for widespread and economical use without the need for special materials or tools in assembling the aquarium.

No metal parts are used for the aquarium, even for the hood. Also, the switches and ballasts, etc. for the lamp are concealed either in the hood or in a shelf below the aquarium tank body. Moreover, a simple design for a multi-compartmented aquarium tank body has been devised which is capable of taking many different shapes.

Obviously, many modifications and variations of the present invention are possible in the light of the above teachings. It is therefore to be understood that within the scope of the appended claims, the invention may be preacticed otherwise than as specifically described.

What is claimed is:

1. An aquarium assembly comprising a transparent tank body, base plate means at one end thereof, an upright tube within said body and extending through said plate means at substantially the central portion thereof, at least two compartments within said body defined by at least one divider wall extending between said tube and the side wall of said body, a perforated filter plate in each said compartment spaced from said base plate means, and a filtration air tube for each said compartment extending upwardly through said tube.

2. The assembly according to claim 1 including a biological filter stack mounted on each said perforated filter plate in operative communication with the filter, each said air tube forming a part of each said filter stack.

3. The assembly according to claim 1 further including a cover of synthetic resin for the top of said tank body, said cover having an opening therein, a lamp housing disposed over and hinged along one edge of said opening, a support plate spaced below and parallel to the top of said housing, a lamp mounted on said support plate, and a glass mirror secured to said support plate.

4. The assembly according to claim 3 further including a shelf spaced below and secured to said base plate means for housing lamp accessories for said lamp, electric wiring extending through said tube between said lamp and said lamp accessories.

5. An aquarium assembly comprising, a transparent tank body, base plate means at one end thereof, an upright tube within said body and extending through said plate means at substantially the central portion thereof, at least one compartment within said body defined between the side wall of said body and said tube, a perforated filter plate in said compartment spaced from said base plate means, and a filtration air tube for said compartment extending upwardly through said tube.

6. The assembly according to claim 5 including at least one biological filter stack mounted on said filter plate in operative communication therewith, said air tube forming a part of said filter stack.

7. The assembly according to claim 5 further including a cover of synthetic resin for the top of said tank body, said cover having an opening therein, a lamp housing disposed over and hinged along one edge of said opening, a support plate spaced below and parallel to the top of said housing, a lamp mounted on said support plate, and a glass mirror secured to said support plate.

8. The assembly according to claim 7 further including a shelf spaced below and secured to said base plate means for housing lamp accessories for said lamp, electric wiring extending through said tube between said lamp and said lamp accessories.

* * * * *